Figure 3E:
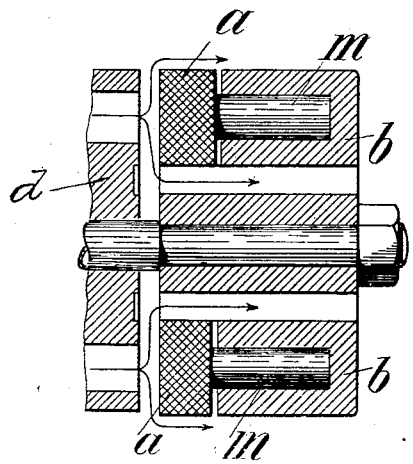
Figure 4E:
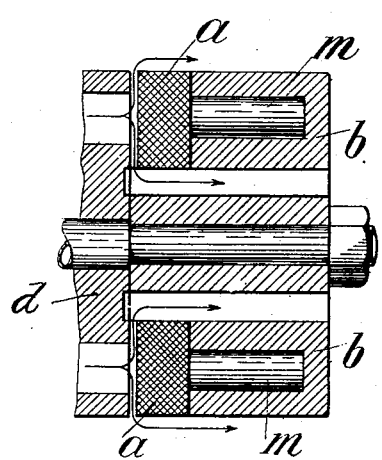

No. 738,122. PATENTED SEPT. 1, 1903.
P. F. ODDIE.
VALVE ARRANGEMENT FOR PUMPS.
APPLICATION FILED FEB. 3, 1903.
NO MODEL. 3 SHEETS—SHEET 1.
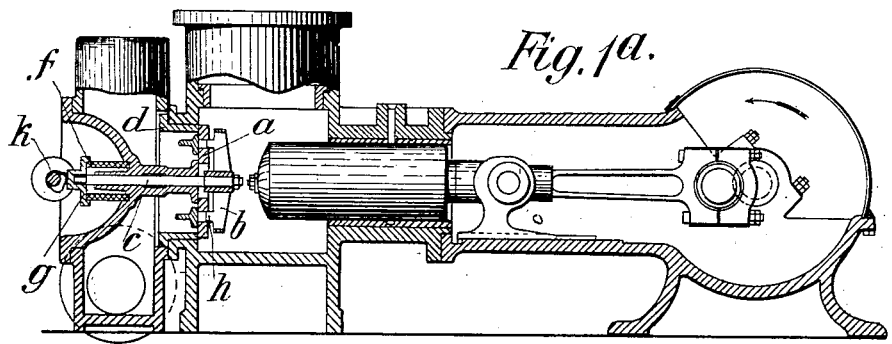
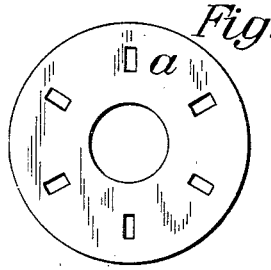
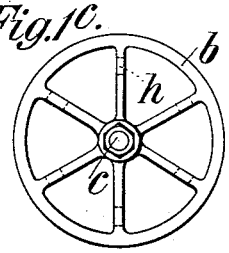
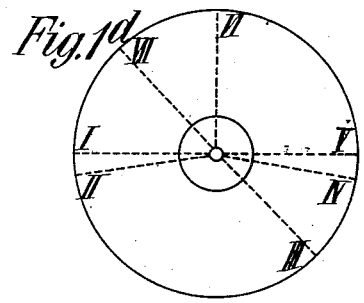
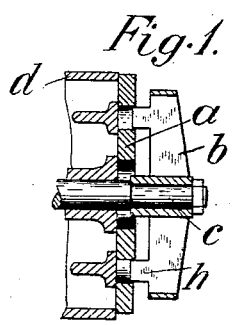
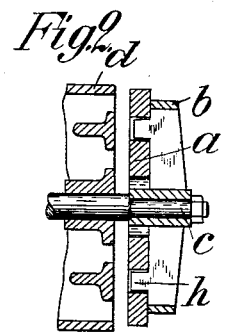
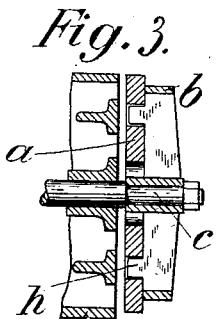
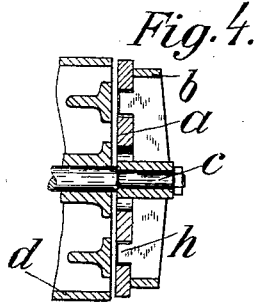
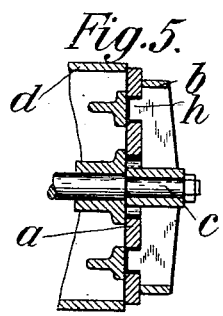
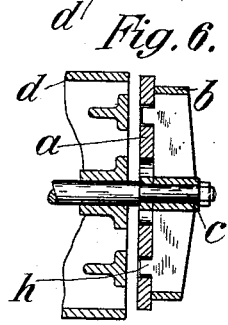
WITNESSES:
F. W. Wright.
E. W. Collins.
INVENTOR
PHILIP FRANCIS ODDIE
BY Howson and Howson
HIS ATTORNEYS.

No. 738,122. PATENTED SEPT. 1, 1903.
P. F. ODDIE.
VALVE ARRANGEMENT FOR PUMPS.
APPLICATION FILED FEB. 3, 1903.
NO MODEL. 3 SHEETS—SHEET 2.
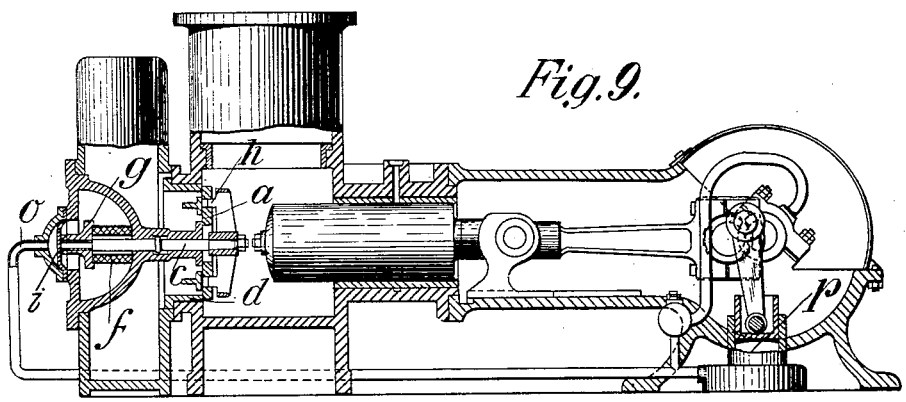
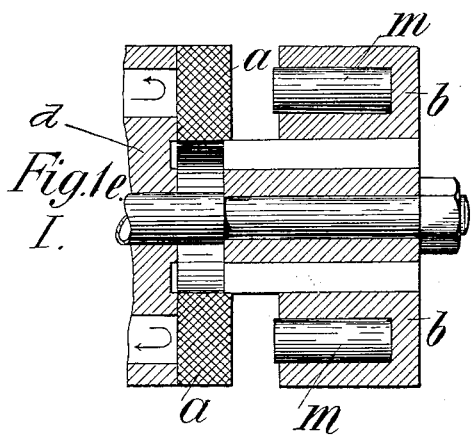
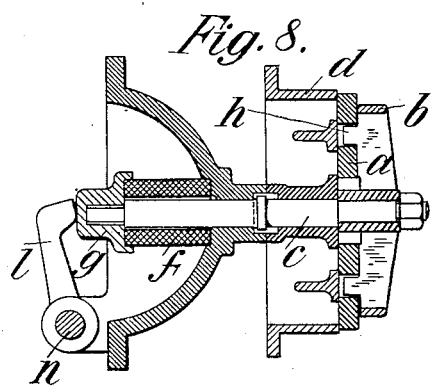
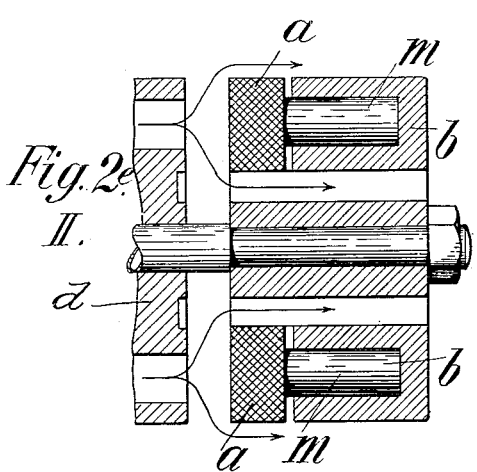
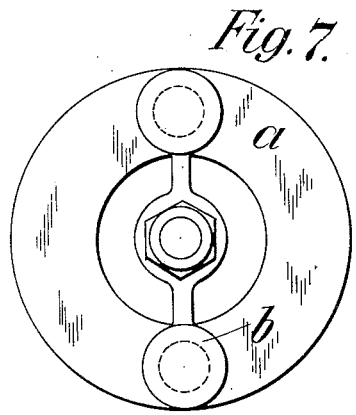
WITNESSES:
F. W. Wright
E. W. Collins
INVENTOR
PHILIP FRANCIS ODDIE
BY Howson and Howson
HIS ATTORNEYS.

No. 738,122. Patented September 1, 1903.

UNITED STATES PATENT OFFICE.

PHILIP FRANCIS ODDIE, OF WIMBLEDON, ENGLAND.

VALVE ARRANGEMENT FOR PUMPS.

SPECIFICATION forming part of Letters Patent No. 738,122, dated September 1, 1903.

Application filed February 3, 1903. Serial No. 141,787. (No model.)

*To all whom it may concern:*

Be it known that I, PHILIP FRANCIS ODDIE, a subject of the King of Great Britain and Ireland and Emperor of India, residing at Wimbledon, England, have invented certain new and useful Improvements in Valve Arrangements for Pumps, of which the following is a specification.

The object of the present invention is a particular valve arrangement which is especially applicable to the suction-valve of quick-running pumps. This valve arrangement belongs to that class in which a free opening but a positive or forced closing of the valve takes place. The present invention differs principally from all known arrangements which also have a free opening and a positive closing by the fact that there is no connection of the suction-valve with the piston. The piston and the valve can therefore by means of the present arrangement move independently of each other, which insures the correct working of each part, whereas this is not possible when the reciprocating movement of the valve is dependent on the piston, as in this case the movement of the valve is necessarily dependent on the movement of the piston. This arrangement is distinguished by the fact that the valve consists of two principal parts—the valve-holder, which carries on a spindle connected with it the closing-spring, and the valve-ring itself, which moves independently and is exceedingly light. Both parts work in such a manner in relation to one another and the one part is worked in such a way by means of an outside gear that the opening of the valve-ring takes place independently without resistance from the spring and not simultaneously with the valve-holder, which has already been positively opened. On the other hand, the closing of the valve-holder takes place at the same time as that of the valve-ring and only through the influence of the pressure brought to bear by the action of the spring. The complete valve-gear can be worked at will by mechanical, hydraulic, or electrical means. The valve-spindle and the spring for closing the same are outside the pump-chamber, and therefore also outside the flow of water.

In the drawings, Figure 1$^a$ shows such a valve arrangement in connection with the other parts of the pump. The gear for moving the valve-holder shown in this modification is only chosen as an example, and any other suitable method can be substituted for it. Figs. 1$^b$ and 1$^c$ show the details of the valve and valve-holder. Fig. 1$^d$ shows schematically the crank in various positions, and in Figs. 1 to 6 is shown the relative position which the valve-ring and the valve-holder bear to the crank in the various positions shown from I to VII. Figs. 1$^e$, 2$^e$, 3$^e$, 4$^e$, 5$^e$, 6$^e$, and 7 show in section and elevation a modification of the valve arrangement in which springs are used in the valve-holder. Figs. 8 and 9 show further modifications of the device for moving the valve-holder.

Figure 5E:
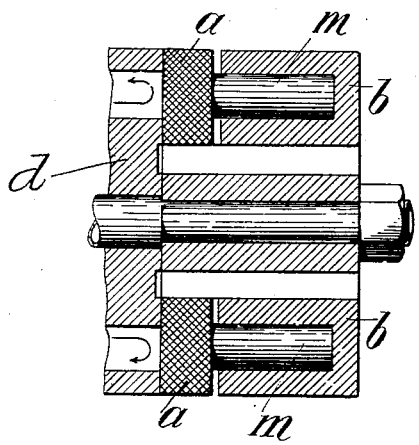
Figure 6E:
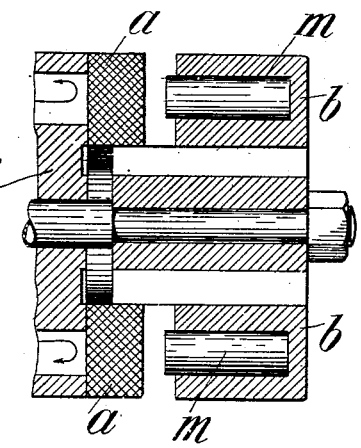

The valve consists of the valve proper—that is, the closing part $a$, which in the detailed example shown has the form of a ring, and the valve-holder $b$. A spindle $c$ is connected with the valve-holder $b$, which projects through the valve-seat $d$ and carries a strong spring $f$, which bears on one side on the pump-casing or valve-seat and on the other presses against a head $g$, which is formed on the spindle $c$. The spring $f$ is preferably made of rubber or some other suitable material and makes an air-tight joint around the hole in the seat, through which the spindle passes, thus doing away with the necessity for a stuffing-box. Any other sort of spring can also be used. The spring and the spindle are not in connection with the flow of the water. The only parts in the water-space—that is, in the interior of the pump—are the valve proper $a$ and the valve-holder $b$, as well as the valve-seat $d$. The ring-shaped closing part is free to move against the valve-holder, but is guided by the projections $h$ of the same. It is also possible to guide it by any suitable way. On the head $g$ of the valve-spindle $c$ the regulating arrangement, which in this case is a cam $k$, works. This cam is driven from the pump-shaft. The method in which the pump works is shown in Figs. 1 to 6. In Fig. 1 crank position I—that is, at the end of the pressure period—the valve-holder $b$ is forced by the gear away from the closing parts, which latter are completely freed from any pressure from the spring. The valve proper is in consequence almost without weight. It opens from the seat $d$ until it is stopped in its course by the valve-holder $b$. This position is shown in Fig. 2. In position III, Fig. 3, the valve-closing spring begins to move back the valve-holder and with it the valve-ring. In position IV, Fig. 4, the valve-ring $a$ has nearly closed and the stroke of the pump is nearly ended. Fig. 5 corresponds to the crank positions V and VI the valve-ring has closed. In position VII, Fig. 6, the valve-holder leads and the valve-ring is free. The closing-spring attains then its highest pressure. In the modification shown in Figs. $1^c$ to $6^c$ and 7 are placed in the valve-holder $b$ springs $m$, made of rubber or other suitable material, which project somewhat beyond that surface of the valve-holder $b$ which is in proximity to the valve-ring $a$. The valve-holder $b$ differs therefore somewhat in form from that shown in elevation in Fig. $1^c$ and in section in Figs. 1 to 6. In Fig. $1^c$ the parts are in the position corresponding to crank position I, Fig. $1^d$. This position corresponds to the end of the pressure period of the pump. The valve-ring is altogether unloaded. In position II, which is shown in Fig. $2^e$, the suction-valve has suddenly fully opened and has struck against the holder $b$ or rather against the springs $m$. In position III, Fig. $3^e$, the valve-closing spring has begun to force back the valve-holder $b$ and with it the valve-ring $a$. The springs $m$ are pressed stronger together in proportion to the resistance of the water flowing through the valve-opening. In position IV, Fig. $4^e$, the valve-holder $b$ bears on the valve-seat $d$ and is at rest, and the valve-ring $a$ has nearly closed. The springs $m$ have therefore attained their highest pressure, and the stroke of the pistons is nearly ended. Fig. $5^e$ corresponds to positions V and VI in Fig. $1^d$. The closing of the valve-ring has been accomplished through the working of the springs $m$, which now expand, and thereby hold the suction-valve closed until crank position VI is reached. In position VII, Fig. $6^e$, the valve-holder $b$ leads and the valve-ring is unloaded. The closing-spring attains the highest pressure. It would also be possible instead of moving the valve-holder $b$ by means of a rotating cam $k$, as shown in Fig. $1^a$, to cause an oscillating arm $l$ to work on the spindle-head $g$. This arm is fixed to a spindle, which receives an oscillating motion from the pump-shaft, as shown in Fig. 8. One can also, as shown in Fig. 9, connect the spindle-head with a diaphragm $i$ and allow the pressure from an auxiliary pump $p$, working in advance of the main pump, to work upon the same, connection being made by means of the pipe $o$.

I claim as my invention—

1. A pump having a valve-seat, a valve-holder, means for moving the valve-holder, a free-moving cut-off part mounted thereon and elastic material in the valve-holder to limit the movement of the cut-off part and aid in pressing the same onto the valve-seat.

2. A pump having a valve-seat, a valve holder and spindle, means for positively moving the valve-holder, a freely-moving cut-off part, a rubber spring for loading the valve outside the pump-chamber and surrounding the spindle, forming a tight joint for said valve-spindle where it passes through the pump-wall.

In testimony whereof I have signed my name to this specification in the presence of two subscribing witnesses.

PHILIP FRANCIS ODDIE.

Witnesses:
SARAH C. McKELLIP,
JAMES L. A. BURRELL.